United States Patent [19]
Adams

[11] Patent Number: 5,608,983
[45] Date of Patent: Mar. 11, 1997

[54] WATERFOWL DECOY SYSTEM

[76] Inventor: George G. Adams, 60 Meadowbrook, Marion, Ark. 72364

[21] Appl. No.: 526,692

[22] Filed: Sep. 11, 1995

[51] Int. Cl.$^6$ ................................................ A01M 31/06
[52] U.S. Cl. ................................................................ 43/3
[58] Field of Search ........................... 43/2, 3; 446/153, 446/154, 155, 159; D9/125

[56] References Cited

U.S. PATENT DOCUMENTS

| | | | |
|---|---|---|---|
| 4,073,397 | 2/1978 | Snoodgrass | 43/3 |
| 4,539,772 | 9/1985 | Forbes et al. | 43/3 |
| 5,003,718 | 4/1991 | Lenert et al. | 43/3 |
| 5,136,800 | 8/1992 | Lanius | 43/2 |

FOREIGN PATENT DOCUMENTS

| | | | |
|---|---|---|---|
| 775308 | 1/1968 | Canada | 43/3 |

*Primary Examiner*—J. Elpel
*Attorney, Agent, or Firm*—Stephen D. Carver

[57] ABSTRACT

A waterfowl decoy system that may be used by hunters to lure waterfowl within effective killing range is disclosed. The decoy system uses a decoy having a realistic exterior cooperatively coupled to a flotation device. One preferred embodiment of the invention uses a conventional two liter bottle as a flotation device. The decoy resembles the outer appearance of a selected waterfowl. The decoy comprises a shell molded or formed of plastic or wood. The shell may be painted or molded into almost any preferential color or shape to lure the desired game. The shell interior supports a foam subframe that frictionally locks a portion of another decoy within the interior when the decoys are stacked. The foam subframe also frictionally engages the flotation device and serves as a stabilizer when the decoy system is deployed. The shell interior houses a receptacle that selectively couples the flotation device to the decoy. Preferably, the receptacle has an internal threads adapted to threadably receive the flotation device. When deployed, the shell substantially houses the flotation device. The flotation device may be any number of common devices with a threaded neck. The flotation device may be filled with variable amounts of a filler such as sand or dirt or water to selectively alter the flotation depth of the decoy. When several decoy systems are used conjunctively to form a flock, the variation of the flotation depths among the individuals in the flock gives it a more natural appearance.

5 Claims, 6 Drawing Sheets

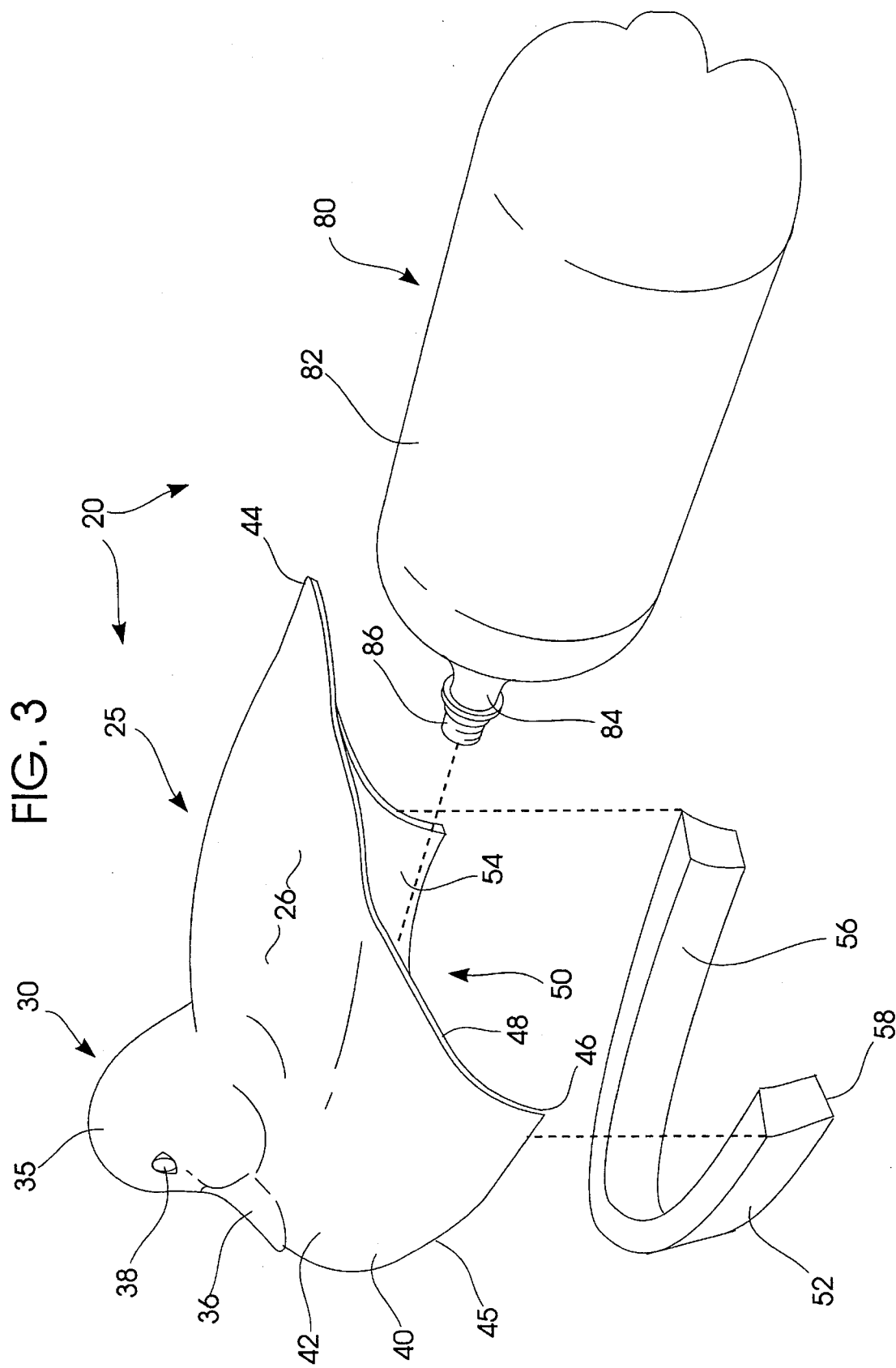

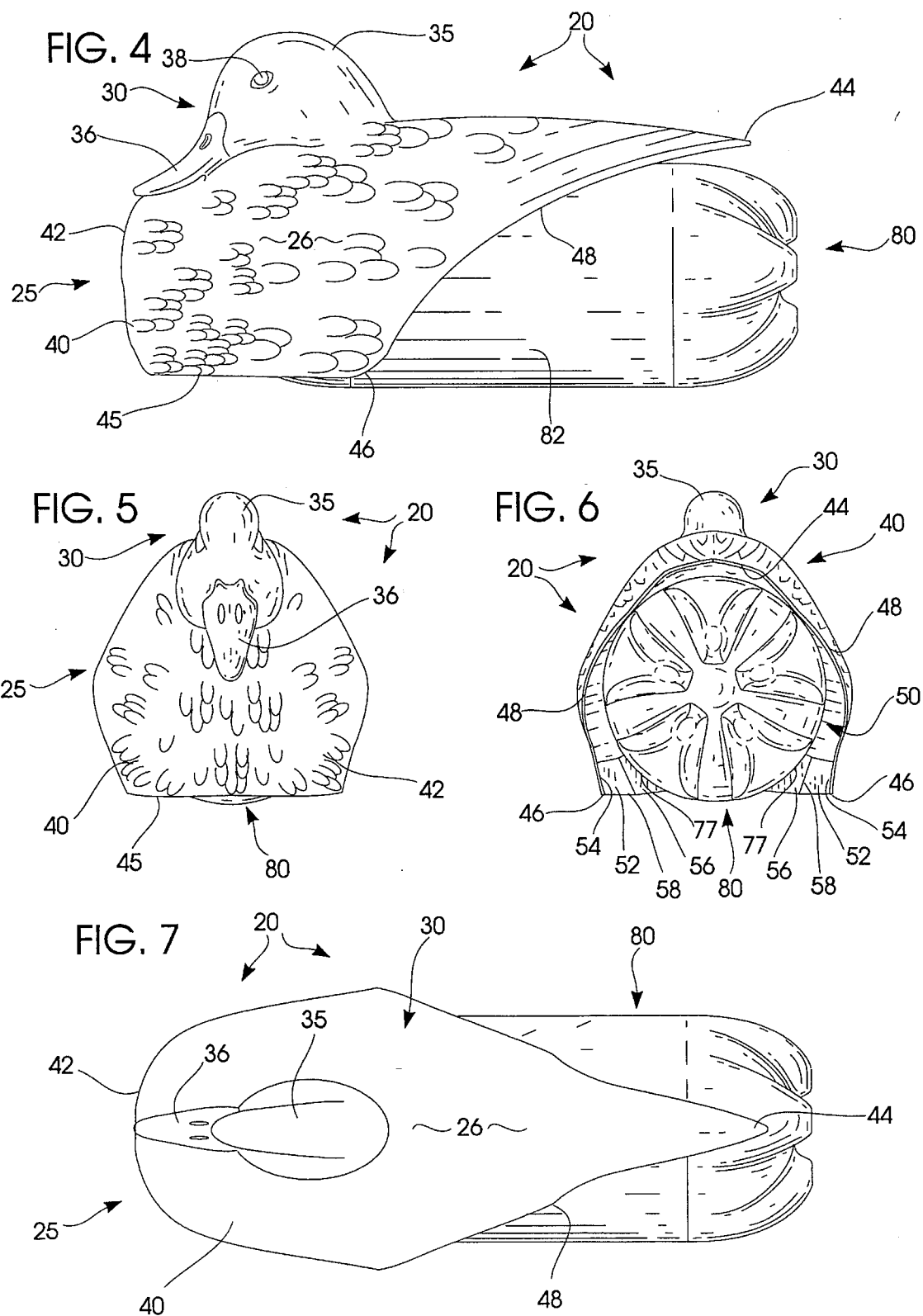

WATERFOWL DECOY SYSTEM

BACKGROUND OF THE INVENTION

1. Field of the Invention

This invention relates to waterfowl decoys used by hunters. More specifically, this invention relates to a shell-type waterfowl decoy that cooperatively employs a variably-weighted flotation device. Known relevant prior art may be found in U.S. Class 43 and the various subclasses thereunder.

2. Discussion of the Prior Art

As will be recognized by those skilled in the art, decoys are commonly employed by waterfowl hunters. Decoys are used to lure game close enough for the hunter to shoot it. Decoys are commonly placed in feeding or resting positions to attract hungry or tired game. Waterfowl hunters generally place their decoys either in the water or upon the land adjacent to the water.

Conventional, land-placed waterfowl decoys may be generally categorized as silhouettes, windsocks, full-body or shell types. Silhouette decoys typically present the appearance of a bird when viewed from overhead. However, because silhouette decoys are generally two-dimensional, the circling game does not consistently see the same view when approaching. Since the goal of a decoy is to simulate real game, silhouette decoys often fail to attract alert animals.

Windsock decoys are often used on land during windy conditions. These decoys move in the wind, looking like real birds. However, windsocks are adversely affected if the wind is variable or if they get wet. They often get wet when they are placed over water because they droop during calm wind conditions.

Shell decoys present the outer appearance of a duck from the top and sides. However, unlike full-body decoys, the bottom of a shell decoy is typically open. Shell decoys are generally easy to transport and store because they often are stackable. In other words, shell decoys can often be stacked upon one another and compressed.

Full-body decoys are either carved from wood or molded from plastic. Plastic decoys typically have hollow interiors. Full-body decoys work well on water or land. However, full-body decoys suffer from several inherent disadvantages. They are bulky and cumbersome compared to the other types of decoys, making them more difficult to transport and store. They are also more expensive to manufacture and produce than silhouette or shell decoys.

However, of the above types of decoys, only full-body decoys are commonly used in the water. This is because decoys used in the water must float upon or be supported above the water. Known windsock, shell and silhouette decoys must be supported above the water while conventional full-body decoys float upon the water. Floating full-body decoys have traditionally performed better than the other types of decoys because they bob up and down in the water like real birds.

In addition to the inherent problems with full-body decoys, they also generally all float at the same level in the water. But, flocks of real birds do not float at the same level in the water. In other words, some birds float higher in the water while some birds float deeper in the water.

Thus, it would be desirable to replace full-body decoys with either a silhouette or a shell decoy that floated on the water. In particular, a shell decoy would improve the cost efficiency of the manufacturing process and the storage capacity of most hunters while withstanding the rigors associated with hunting in the water. A shell decoy that permitted compact stacking of several decoys to simplify transportation and storage would also be desirable.

An ideal decoy would also permit the hunter to vary the flotation level of an individual decoy. This would permit the hunter to selectively float several decoys at different levels in the water, giving the flock of decoys a more natural appearance.

SUMMARY OF THE INVENTION

My waterfowl decoy system may be used by hunters to lure waterfowl within effective killing range. The decoy system uses a decoy having a realistic exterior shell cooperatively coupled to a flotation device. One preferred embodiment of the invention uses a conventional two liter bottle as a flotation device.

The decoy resembles the outer appearance of a selected waterfowl. The selected decoy depends upon the particular waterfowl being hunted. The decoy comprises a shell molded or formed of plastic or wood. Of course, the shell may be formed from any suitable material not adversely affected in a water environment. The shell may be painted or molded into almost any preferential color or shape to lure the desired game.

The shell interior supports a foam subframe that frictionally locks a portion of another decoy within the interior when the decoys are stacked. The foam subframe also frictionally engages the flotation device and serves as a stabilizer when the decoy system is deployed.

The shell interior also houses a receptacle that selectively couples the flotation device to the decoy. Preferably, the receptacle has an internal threaded portion adapted to threadably receive the bottle.

When the decoy system is deployed, the shell substantially houses the flotation device. The flotation device may be any number of common devices with a threaded neck (i.e., bottles, jars, etc.). In one preferred embodiment, the flotation device is a conventional, plastic bottle of the type that are readily available at many retail stores. The particular bottle size that is preferred holds approximately two liters of liquid. Such bottles are commonly referred to as a two liter bottles.

The flotation device may be filled with variable amounts of a filler such as sand or dirt or water to selectively alter the flotation depth of the decoy. When several decoy systems are used conjunctively to form a flock, the variation of the flotation depths among the individuals in the flock gives it a more natural appearance.

Thus, a primary object of the invention is to provide a waterfowl decoy system of the character hereinbefore described that may be assembled quickly and conveniently.

A related object of the invention is to provide a decoy system that disassembles into a decoy that may be conveniently transported and stored and a flotation device that may be thrown away.

A related object is to provide a decoy system that may be assembled quickly from a decoy and a conventional bottle.

Another object of the invention is to provide a decoy system that uses conventional bottles for flotation devices.

A more basic object of the invention is to provide a floatable, shell decoy that stacks compactly.

A related object is to provide a decoy using internal components to selectively couple the decoy to a flotation device.

A basic object of the invention is to provide a cost-effective decoy that cooperatively couples with an inexpensive flotation device.

Yet another basic object of the invention is to permit a hunter to vary the depth at which the decoy system floats upon the water.

A basic object of the invention is to provide a decoy of the character described that will attract waterfowl to the hunter.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 3 is a partially exploded isometric view similar to FIG. 2, with the flotation device and subframe exploded for clarity;

FIG. 4 is a right side elevational view of the decoy system, with the opposite side being a mirror thereof;

FIG. 5 is a front elevational view of the decoy system;

FIG. 6 is a rear elevational view of the decoy system;

FIG. 7 is a top plan view of the decoy system;

DETAILED DESCRIPTION

Figure 1:
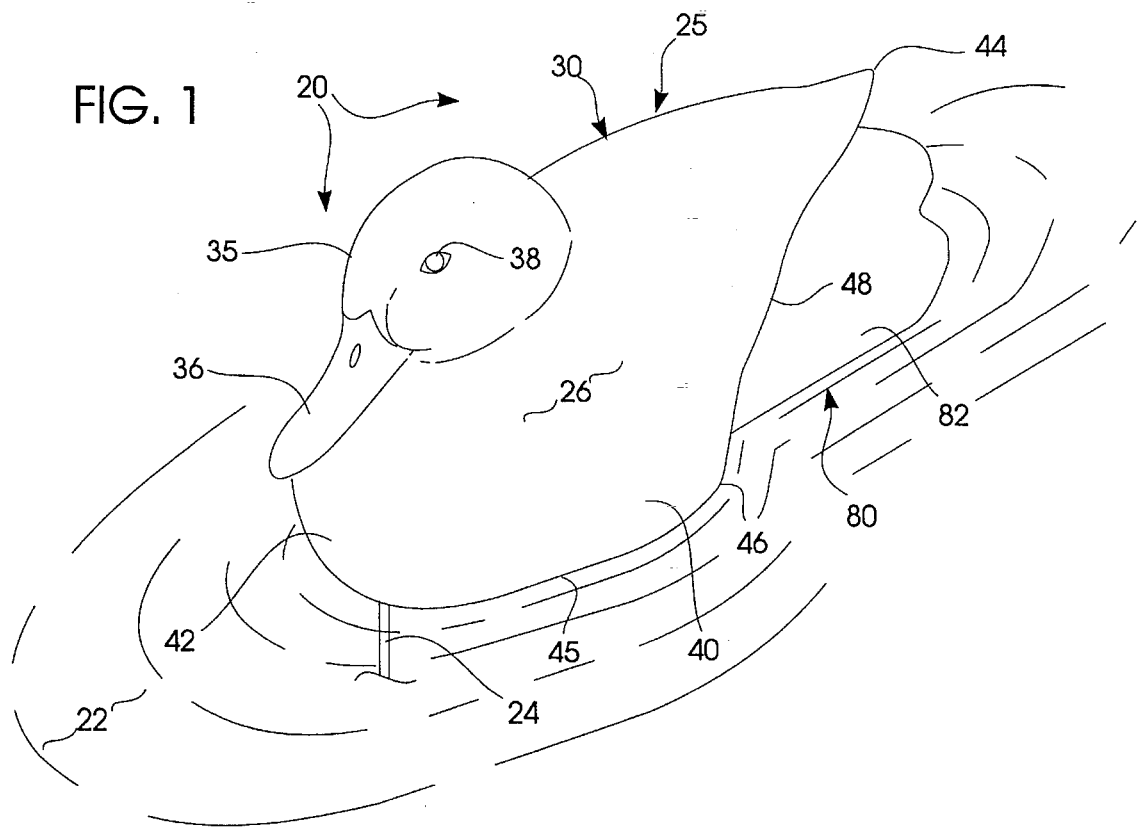
FIG. 1 is a front environmental view of a preferred embodiment of the waterfowl decoy system, taken generally from the front, showing the decoy system floating on water.
Figure 2:
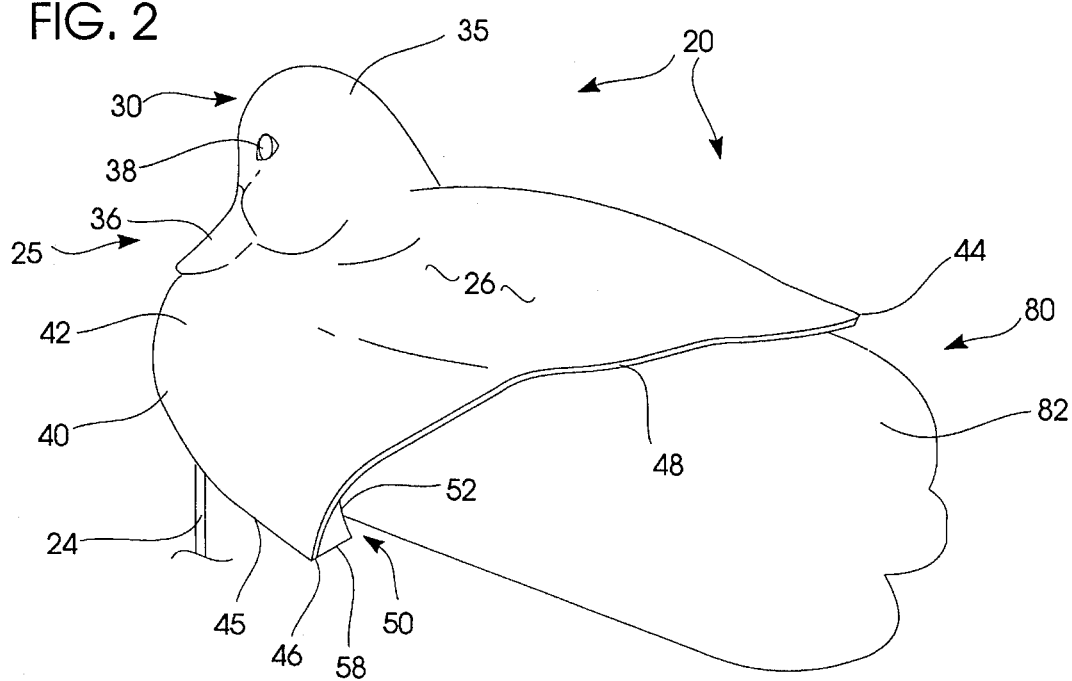
FIG. 2 is an isometric view taken generally from the rear of the decoy system.
Figure 8:
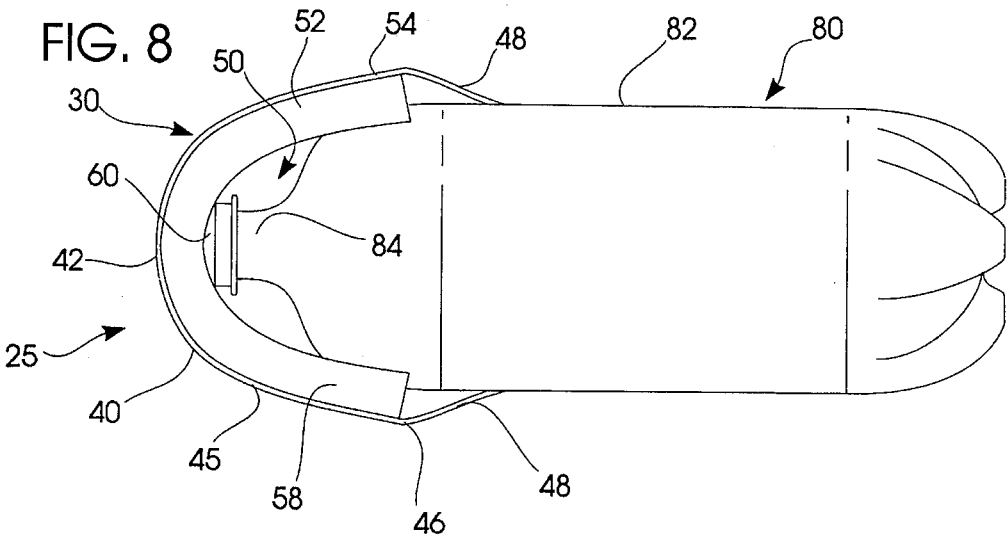
FIG. 8 is a bottom plan view of the decoy system.

The waterfowl decoy system is generally represented by reference numeral 20 (FIGS. 1–14). The waterfowl decoy system 20 comprises a decoy 25 coupled to a flotation device 80. The system is preferably employed on a lake 22 or other similar pool of water. Each decoy system 20 is optionally secured with a rope or string 24.

Normally, decoy 25 resembles a duck or a goose or any other type of selected waterfowl. The type of waterfowl represented upon the decoy exterior surface 26 will depend upon the type of game being hunted, birds of a feather tending to flock together.

Decoy 25 comprises an exterior shell 30 that defines an interior housing 50. Shell 30 is either carved from wood or molded out of plastic. Of course, shell 30 can be formed from any suitable material not adversely affected in a water environment. Preferably, the shell surface 26 is painted or molded into a selected color or shape to attract animals thereto.

Shell 30 forms the shape of a head 35 and a body 40 (FIGS. 1–14). The head 35 arcuately protrudes outwardly from the body 40. An integral beak 36 extends downwardly and forwardly from head 35. A pair of opposing eyes 38 are defined in head 35.

The body 40 comprises a generally rounded front 42 and a spaced apart, pointed rear 44. A planar bottom 45 extends rearwardly from the front 42 to an approximate midpoint 46. A curved cutaway 48 extends upwardly from the bottom 42 to the rear 44.

As can be best seen in FIG. 7, it has been found that shell 30 need not cover the entire flotation device 80 to effectively attract game. Cutaway 48 reduces material requirements for the decoy and correspondingly reduces manufacturing costs. However, it is within the scope of this invention for substantially all of the flotation device 80 to be covered. This may be easily accomplished by simply expanding the coverage of shell 30 and limiting the size of cutaway 48.

The shell 30 defines an interior housing 50 (FIGS. 6, 8–11). The interior housing 50 receives the flotation device 80. Thus, the flotation device 80 is substantially covered by shell 30 and is concealed from the game.

The interior housing 50 supports an arcuate foam subframe 52. Foam subframe 52 circumscribes the interior lower edge 54.

Figure 12:
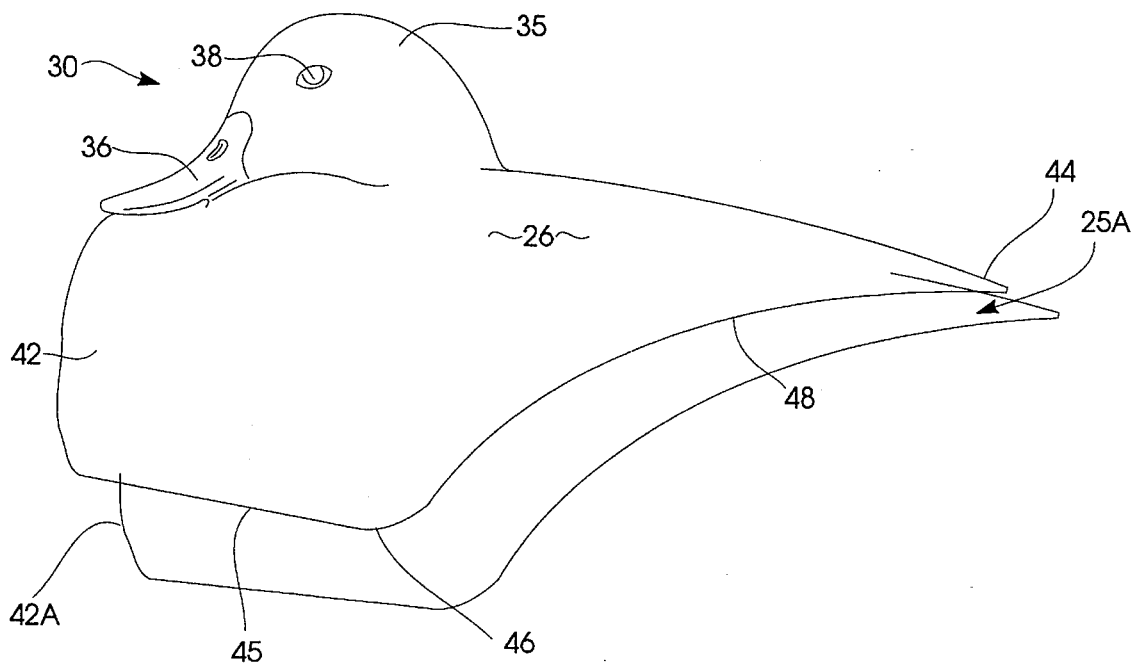
FIG. 12 is a right side elevational view showing several of the decoys in a stacked, storage configuration, with the opposite side being a mirror image thereof.
Figure 13:
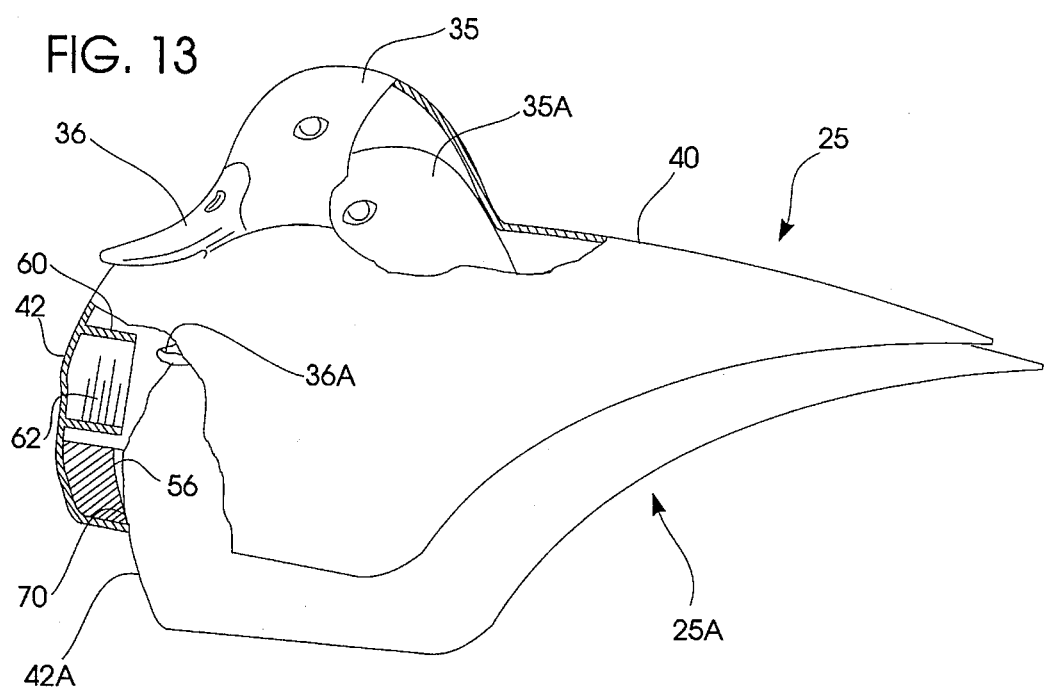
FIG. 13 is a sectional view similar to FIG. 12, showing the interior arrangement of the stacked decoys; and, FIG. 14 is an environmental view similar to FIGS. 1 and 4, showing several decoy systems of varying weights deployed.
Figure 14:
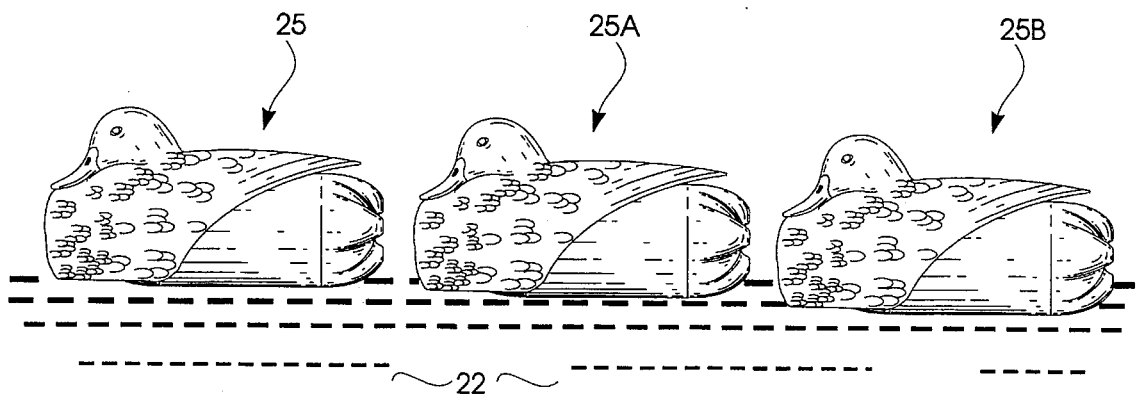

Foam subframe 52 frictionally locks a portion of another decoy 25A within housing 50 when the decoy 25 and decoy 25A are stacked (FIGS. 12 and 13). The inner subframe surface 56 forms a juncture 70 with the front 42A of decoy 25A. The juncture 70 cooperates with another juncture 75 formed by the head 35A of decoy 25A and head 35 of decoy 25 to frictionally lock the decoys 25, 25A together. Thus, several decoys may be compactly stacked and transported.

The foam subframe 52 also frictionally engages the flotation device 80 and serves as a stabilizer when the decoy system 20 is deployed.

The subframe 52 forms a flat bottom 58 that serves to stabilize the decoy system 20 during employment (FIGS. 6, 8–11). The top of subframe inner surface 56 cradles the flotation device 80. A juncture 77 established between the top of inner surface 56 and the flotation device 80 frictionally locks device 80 in decoy 25, effectively preventing the flotation device 80 from revolving after it is secured.

Figure 9:
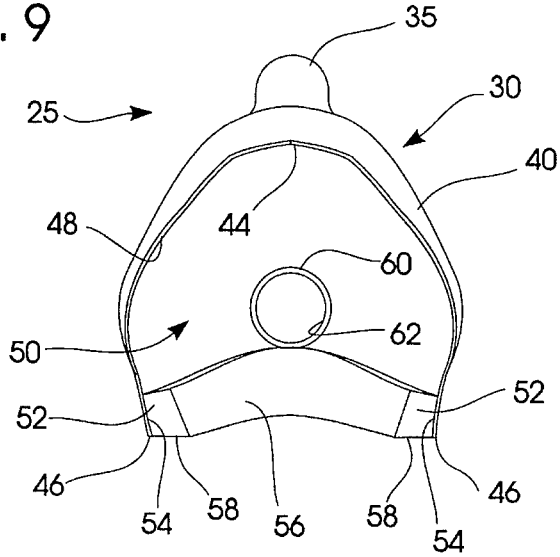
FIG. 9 is a end elevational view of the decoy, showing the interior.
Figure 10:
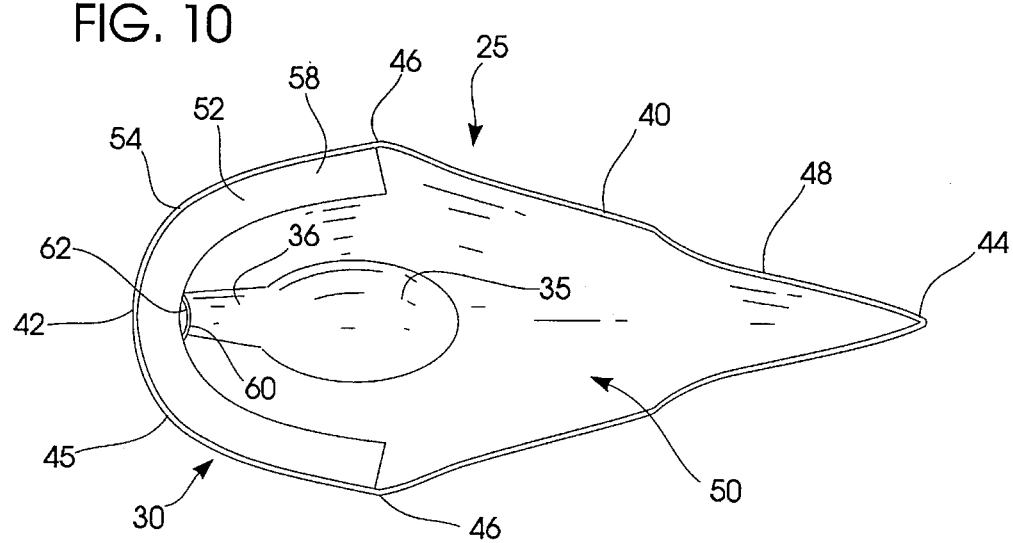
FIG. 10 is a bottom plan view of the decoy.
Figure 11:
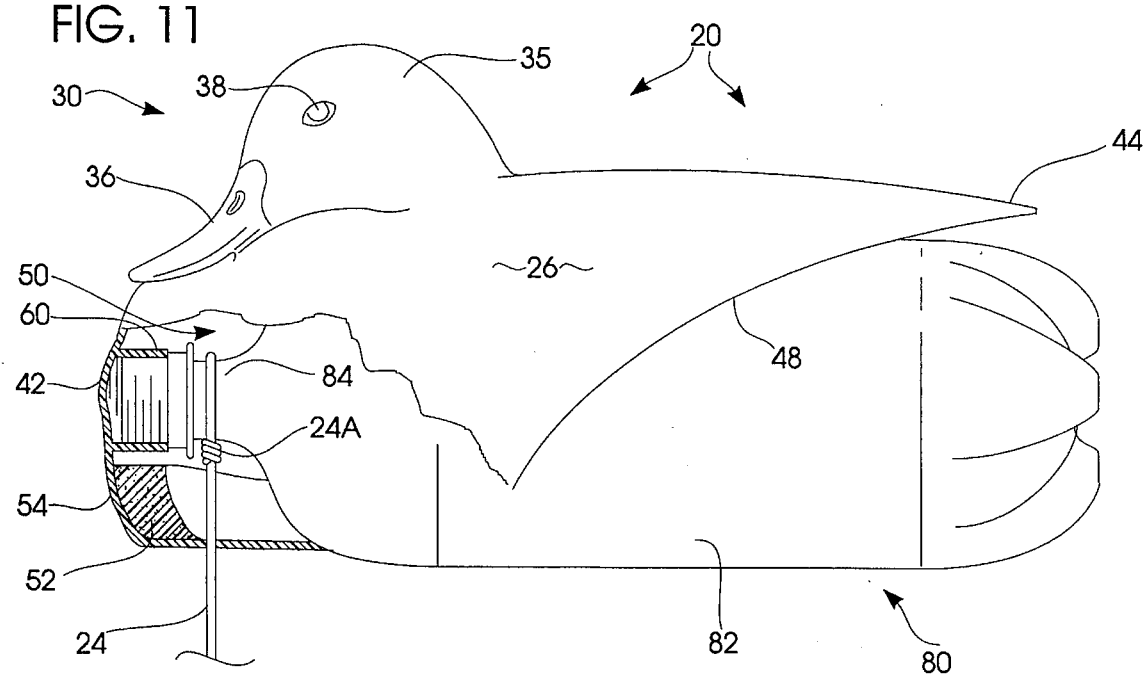
FIG. 11 is a sectional view similar to FIG. 4, showing the interior portions of the decoy system, with portions broken away or omitted for clarity.

The interior housing 50 also supports a receptacle 60 that selectively couples the flotation device 80 to the decoy 25 (FIGS. 9–11). Preferably, the receptacle 60 has internal threads 62 that are adapted to threadably receive the bottle 82.

Flotation device 80 may be any of a number of objects that have a threaded end. Preferably, the flotation device 80 is a well-known, conventional plastic two liter bottle 82 of the type that is readily available at many retail stores. The label and other insignia are removed from the bottle to leave a clear plastic shell. The bottle 82 defines a neck 84 having threads 86 thereupon. The string 24 is generally secured to neck 84 with knot 24A.

In use, bottle 82 may be filled with variable amounts of water or sand or another filler at the site to properly float the decoy system 20 at a desired level in the water. Then, the hunter simply screws the bottle 82 in receptacle 60 and appropriately places the decoy system 20. When several decoy systems 25, 25A, 25B are used conjunctively to form a flock 27 (FIG. 14), the variation of the flotation depths among the individuals 25, 25A, 25B in the flock gives it a more natural appearance.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A waterfowl decoy system comprising:

a decoy comprising a hollow shell having an exterior that resembles a waterfowl and a hollow interior;

a flotation device adapted to be removably coupled in said shell interior for floating said decoy system; and, an arcuate, foam subframe on said interior adapted to releasably, frictionally engage said flotation device.

2. A waterfowl decoy system comprising:

a decoy comprising a hollow shell having an exterior that resembles a waterfowl and a hollow interior;

a flotation device adapted to be removably coupled in said shell interior for floating said decoy system, said flotation device comprising a bottle having a threaded end; and, said interior comprises a threaded receptacle adapted to be at least temporarily threadably coupled to said threaded end and said interior further comprises an arcuate, foam subframe releasably, frictionally engaging said flotation device.

3. A waterfowl decoy system comprising:

a plurality of decoys, each comprising a hollow shell having an exterior that resembles a waterfowl covering an arcuate foam subframe;

a flotation device for each decoy adapted to coupled within said shell; and, means for releasably securing said flotation device within said shell.

4. The decoy system as defined in claim 3 wherein:

each flotation device comprises a bottle having a threaded end; and, each shell comprises an interior, threaded receptacle adapted to be at least temporarily threadably coupled to said threaded end.

5. The decoy system as defined in claim 4 wherein each of the shells may be stacked together one on top of another.

\* \* \* \* \*